United States Patent
Lopez

(10) Patent No.: US 10,875,600 B1
(45) Date of Patent: Dec. 29, 2020

(54) QUICK RELEASE BALL-LOCK PEDAL SPINDLE

(71) Applicant: Mario Alfredo Lopez, Chula Vista, CA (US)

(72) Inventor: Mario Alfredo Lopez, Chula Vista, CA (US)

( * ) Notice: Subject to any disclaimer, the term of this patent is extended or adjusted under 35 U.S.C. 154(b) by 0 days.

(21) Appl. No.: 16/801,161

(22) Filed: Feb. 26, 2020

(51) Int. Cl.
*B62M 3/08* (2006.01)
*B62M 3/00* (2006.01)

(52) U.S. Cl.
CPC ............... *B62M 3/08* (2013.01); *B62M 3/003* (2013.01)

(58) Field of Classification Search
CPC ........ B62M 3/08; B62M 3/003; B62M 3/083; B62M 3/086; B62M 3/10; B62M 3/02; B62M 1/36; F16B 2/02; F16B 2/04; F16B 2/16; F16B 7/042; F16B 7/1409; F16B 7/1436
See application file for complete search history.

(56) References Cited

U.S. PATENT DOCUMENTS

| | | | | |
|---|---|---|---|---|
| 5,303,908 A | * | 4/1994 | Halder | B23B 31/1071 269/48.1 |
| 5,315,896 A | * | 5/1994 | Stringer | B62M 3/08 403/377 |
| 5,586,472 A | * | 12/1996 | Lin | B62M 3/08 403/325 |
| 6,568,296 B1 | * | 5/2003 | Lin | B62K 15/00 74/594.1 |
| 7,296,534 B2 | * | 11/2007 | Fink | H01J 37/3244 118/723 E |
| 8,490,514 B2 | * | 7/2013 | Giudici | B62H 5/10 74/594.1 |
| 2003/0205103 A1 | * | 11/2003 | Vaughn | B62K 15/00 74/594.1 |
| 2010/0098484 A1 | * | 4/2010 | Chen | B62M 3/08 403/321 |

(Continued)

FOREIGN PATENT DOCUMENTS

| | | | | |
|---|---|---|---|---|
| DE | 102006052480 A1 | * | 5/2007 | ......... B25B 23/0035 |
| DE | 102010005895 A1 | * | 7/2011 | ............... F16B 2/16 |
| DE | 202019106030 U1 | * | 1/2020 | ............. F16B 19/02 |

OTHER PUBLICATIONS

Machine Translation of DE 10 2006 052 480, obtained Oct. 23, 2020.*

(Continued)

*Primary Examiner* — Richard W Ridley
*Assistant Examiner* — Brian J McGovern

(57) ABSTRACT

In traditional bicycle pedals, the mechanism that maintains a pedal's rocking synchronicity with the rotating crank consists of a spindle that extends in the interior of the pedal's cylindrical housing that is typically furnished with ball bearings, a washer, and a nut at the endmost part of the pedal to secure all of its axle components in place. To attach to the crank arm, the right side pedal spindle typically has a right-hand thread and removes counterclockwise while installs clockwise, and the left side pedal spindle has a left-hand thread that removes clockwise and installs counterclockwise. The present invention facilitates the mounting of bicycle pedals by using a square end (i.e. the four flat sides to the mounting end of the spindle) and a ball-lock mechanism to secure the pedal to the crank arm.

8 Claims, 3 Drawing Sheets

Quick Release Ball-Lock Pedal Spindle

(56) References Cited

U.S. PATENT DOCUMENTS

2010/0229676 A1\* 9/2010 Chen .................. B62M 3/08
                                                74/594.4
2018/0274581 A1\* 9/2018 Anderes ............. F16B 35/06

OTHER PUBLICATIONS

Machine Translation of DE 20 2019 106 030, obtained Oct. 23, 2020.\*

Machine Translation of DE 10 2010 005 895, obtained Oct. 23, 2020.\*

\* cited by examiner

Quick Release Ball-Lock Pedal Spindle

QUICK RELEASE BALL-LOCK PEDAL SPINDLE

BACKGROUND OF THE INVENTION

1. Field of Invention

The present invention consists of a square end ball-lock pedal spindle for easy and secure mounting of pedals to crank arm. The spindle is lightweight and strong, efficient for high performance pedaling. Here, it is claimed that the unique square attachment end design and spindle ball-lock mechanism is an innovation to how pedals are secured to their corresponding crank arms.

2. Description of Related Art

In traditional bicycle pedals, the mechanism that maintains a pedal's rocking synchronicity with the rotating crank consists of a spindle that extends in the interior of the pedal's cylindrical housing that is typically furnished with ball bearings, a washer, and a nut at the endmost part of the pedal to secure all of its axle components in place. To attach to the crank arm, the right side pedal spindle typically has a right-hand thread and removes counterclockwise while installs clockwise, and the left side pedal spindle has a left-hand thread that removes clockwise and installs counterclockwise. While the mechanical aspect remains relatively unchanged in this pedal spindle design, the present invention does facilitate the mounting of bicycle pedals by using a square end (i.e. the four flat sides to the mounting end of the spindle) and a ball-lock mechanism to secure the pedal to the crank arm.

As early as Lallement's improvement of velocipedes in 1866 (P. Lallement, No. US000059915) with the adoption of the modern crankset for mechanically propelling the bicycle in its early developments, the pedal spindle has virtually remained unchanged. In 1922, the Italian immigrant, Tony Bacigalupi, designed the first innovation to the pedal spindle (T. Bacigalupi, No. US00492191) by threading the interior of the spindle attachment end and incorporating a cap screw to fix the pedal to the crank arm. Bacigalupi's invention; however, was merely intended to resolve the issue of pedals becoming frozen onto their spindles, thereby making the changing of pedals a task that could potentially damage the crank arm in the process. To be sure, Bacigalupi's innovation changed nothing on the functional aspect of the pedal spindle and little on how it is actually mounted onto the crank arm.

The present pedal spindle (FIG. 1) invention improves the mode of attachment to the crank arm (FIG. 3). Instead of continuing with the typical screw-in design of the past century, this invention improves how pedals are attached and removed from the crank arms, thereby facilitating pedal attachment and providing the option to speedily change pedal design (e.g. platform vs. quill vs. clipless) to support different types of cycling. This pedal spindle comprises of a hollow core 1; threaded outer end 2; square attachment end 3; sockets 4; ball bearings 5; a pin within the bore with a grooved end for retaining ball bearings 6; a spring gutter on outer end of pin 7; a spring 8; a washer 9; an exposed button end 10; and a nut to hold together the ball-lock mechanism assembly II.

The most obvious distinctive feature of this pedal spindle invention is the square attachment end 3. This attachment end can be retrofitted with a thread adapter having a square center (albeit, square end dimensions will differ slightly), or it can be fitted on a crank arm designed for this spindle as seen in FIG. 3. The square end is intended to fix the spindle to the crank arm, allowing the pedal to rock as the cyclist rotates the crank to propel the bicycle forward. The square attachment end has the advantage of fixing the pedal to the crank arm without the need to screw it in and, therefore, eliminating the need for any tools. Since this spindle invention does not involve a thread to attach the pedal to the crank arm, the ball-lock mechanism is employed as a means to secure the pedal in place (FIG. 3). The spindle's ball-lock mechanism has three main parts that sit within the interior of the spindle's tubular shape 1. The pin 6 goes through the spindle's bore and contains a grooved end for catching ball bearings 5; The spring 8 adds pressure to the pin when pushed from exposed end 10 to release the ball bearings from their sockets 4 on the spindle; The ball bearings 5 lock the pedal spindle in place as they sit in the sockets of the inner peripheral surface of the crank arm FIG. 3. The entire axle 1-11 is fastened to the pedal FIG. 1, and its corresponding parts with two sealed bearings, a washer 9 and nut II.

REFERENCES

Bacigalupi, Tony. Bicycle Pedal Spindle. US00492191, United States Patent and Trademark Office, Sep. 5, 1922. USPTO Patent Full-Text and Image Database, https://pdfpiw.uspto.gov/.piw?PageNum=( )&docid-01492191&IDKey=636650E38359%0D%0A&HomeUrl=http%3A%2F%2Fpatft.uspto.gov%2Fnetacgi%2Fnph-Parser%3FSect1%3DPTO1%2526Sect2%3DHITOFF%2526p%3D1%2526u%3D%2Fnetahtml%2FPTO%2Fsrchnum.html%2526r%3D1%2526f%3G%25261%3D50%2526d%3DPALL%2526s1%3D1492191.PN.%2526OS%3D%2526RS%3D Lallement, Pierre. Improvement in Velocipedes. US000059915, United States Patent and Trademark Office, Nov. 20, 1866. USPTO Patent Full-Text and Image Database, https://pdfpiw.uspto.gov/.piw?PageNum=0&docid=00059915&IDKey=F19D0558DB19%0D%0A&HomeUrl=http%3A%2F%2Fpatft.uspto.gov%2Fnetacgi%2Fnph-Parser%3FSect1%3DPTO1%2526Sect2%3DHITOFF%2526d%3DPALL%2526p%3D1%2526u%3D%25252Fnetahtml%25252FTFPO%25252Fsrchnum.htm%2526r%3D1%2526f%3DG%25261%3D50%2526s1%3D0059%2C915.PN.%2526OS%3DPN%2F0059%2C915%2526RS%3DPN%2F0059%2C915

SUMMARY OF INVENTION

A square end ball-lock pedal spindle for easy and secure mounting of pedals to crank arm.

This invention is an improvement on traditional pedal spindles in that it does not require any tools to mount to the crank arm, thereby facilitating the switching between different types of pedals for different types of cycling.

BRIEF DESCRIPTION OF THE DRAWINGS

The advantages of this invention will become clear in the explanation and accompanying drawings in which like reference numerals designate like parts throughout the figures.

Figure 1:
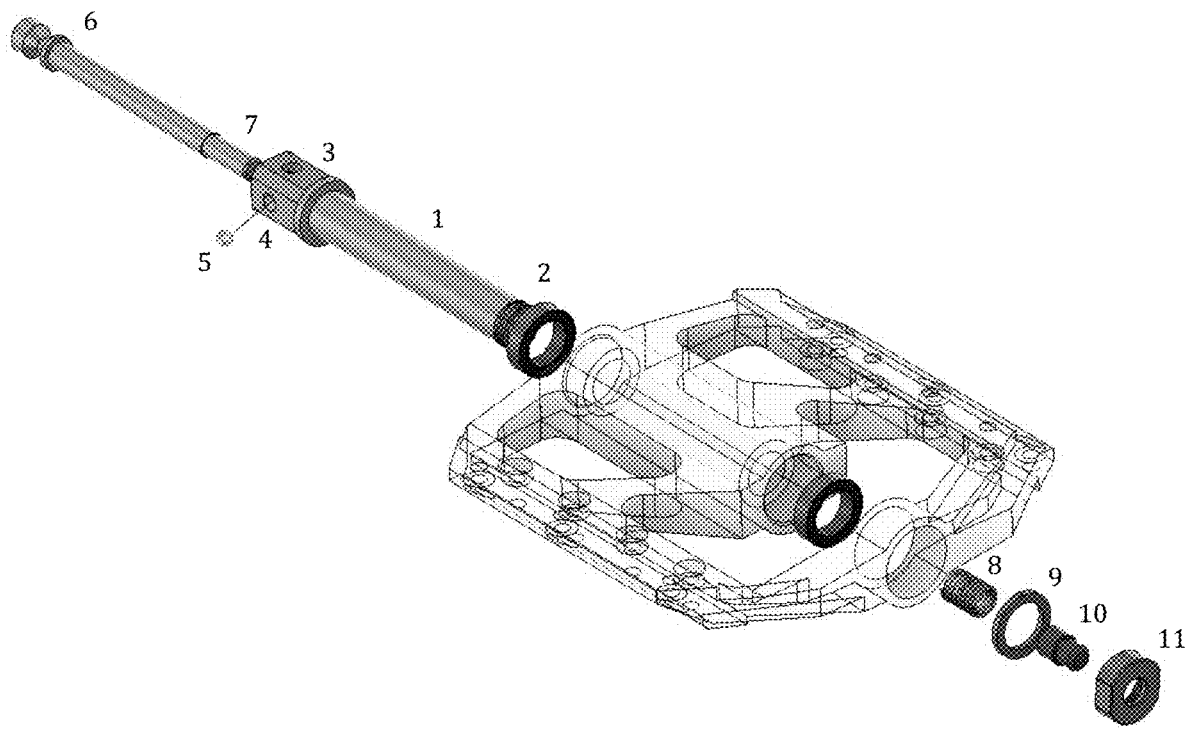
FIG. 1 is pedal spindle body with ball-lock mechanism within a traditional platform pedal.
Figure 2:
FIG. 2 is pedal spindle within a traditional platform pedal.
Figure 3:
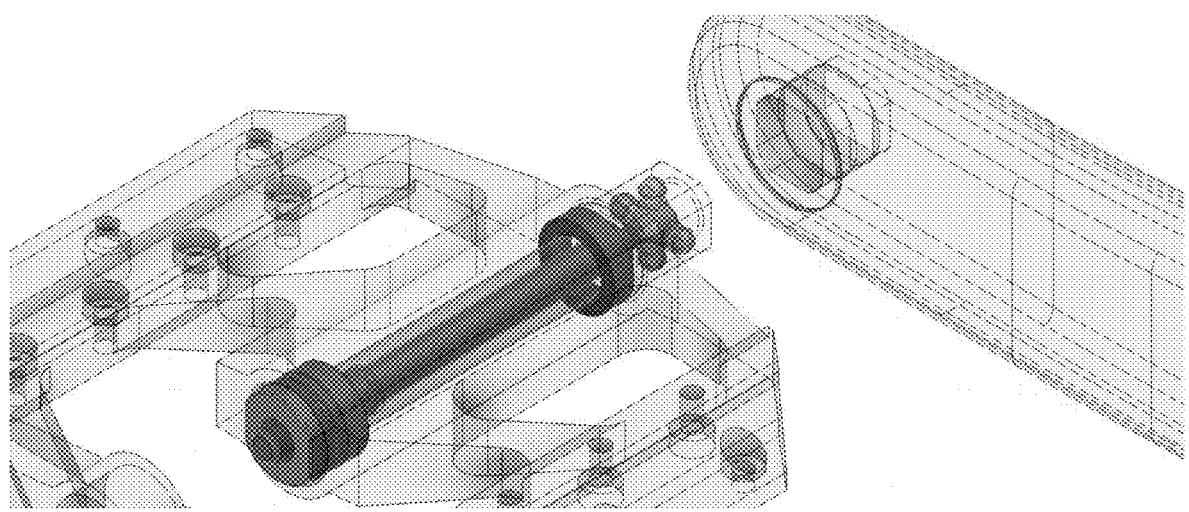
FIG. 3 is complete pedal system and crank arm.

Inventor claim:

1. A bicycle pedal assembly, comprising:

a pedal body;

a spindle extending through the pedal body, the spindle including a square attachment end defining four sides and a threaded outer end opposite to the square attachment end, the square attachment end configured to contact a bore within a crank arm;

a thickness from one of the four sides to another one of the four sides that is parallel and opposed to the one of the four sides is greater than a diameter of the threaded outer end of the spindle;

a ball-lock mechanism comprising a pin extending coaxially through the spindle and at least one ball, the at least one ball is disposed within the bore of the crank arm;

a spring located within the threaded outer end of the spindle, the spring configured to bias the pin in a direction from the square attachment end towards the threaded outer end.

2. The bicycle pedal assembly as claimed in claim 1, wherein the at least one ball includes four balls, each of the four balls corresponding to a respective one of the four sides of the square attachment end.

3. The bicycle pedal assembly as claimed in claim 1, further comprising: a button disposed on an end of the pin.

4. The bicycle pedal assembly as claimed in claim 3, wherein the button is two-piece, separately formed with the pin.

5. The bicycle pedal assembly as claimed in claim 3, further comprising: a nut threadably engaged with the threaded outer end of the spindle.

6. The bicycle pedal assembly as claimed in claim 5, wherein the button extends through the nut and is configured to be pressed by a user of the bicycle pedal assembly.

7. The bicycle pedal assembly as claimed in claim 5, further comprising: a bearing disposed at the threaded outer end of the spindle, the bearing allowing for rotation of the pedal body relative to the spindle.

8. The bicycle pedal assembly as claimed in claim 7, further comprising: a washer disposed between the bearing and the nut.

* * * * *